UNITED STATES PATENT OFFICE.

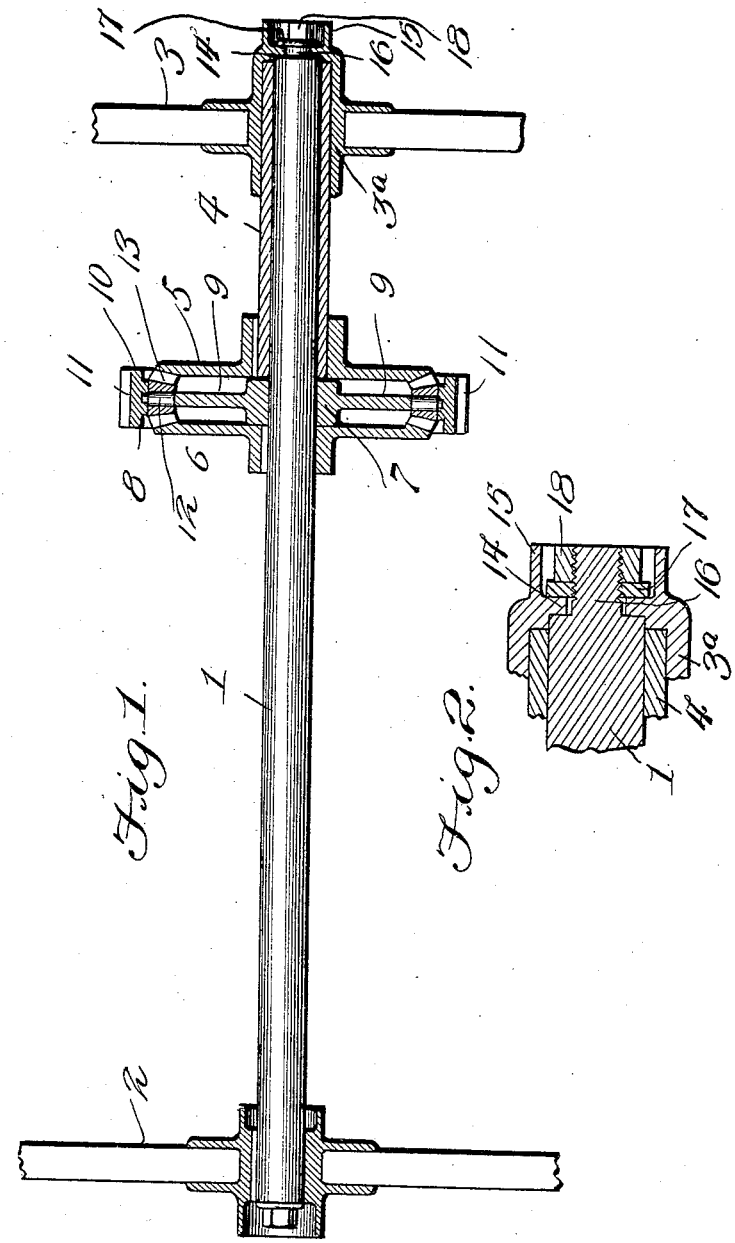

NEWTON M. ANDERSON, OF BEDFORD, INDIANA, ASSIGNOR TO THE BUGGYCAR COMPANY, OF CINCINNATI, OHIO, A CORPORATION OF OHIO.

DIFFERENTIAL DRIVE-GEARING.

No. 908,722.          Specification of Letters Patent.          Patented Jan. 5, 1909.

Application filed October 17, 1907. Serial No. 397,837.

*To all whom it may concern:*

Be it known that I, NEWTON M. ANDERSON, a citizen of the United States, residing at Bedford, in the county of Lawrence and State of Indiana, have invented new and useful Improvements in Differential Drive-Gearings, of which the following is a specification.

This invention relates to differential drive gearing for automobiles and other power-driven vehicles, the object of the invention being to provide a construction whereby a solid axle shaft may be employed and a proper differential driving action secured, and whereby the disadvantages of the use of a divided axle shaft are effectually overcome.

In the accompanying drawing:—Figure 1 is a section through the drive wheels and differential gearing on the line of the axle shaft, the latter appearing in elevation. Fig. 2 is a detail section through the outer end of the sleeve and shaft and associated parts.

1 in the drawing designates a solid or single-piece axle shaft, on the respective ends of which are mounted the traction wheels 2 and 3, the hub of the wheel 2 being keyed or otherwise fixed to the shaft. The wheel 3 has its hub 3ª keyed or otherwise fixed to a hollow shaft or sleeve 4, to the inner end of which is keyed one of the transmission gears 5 of the differential gearing, the other transmission gear 6 of which is keyed to the shaft 1.

The hub 7 of a drive gear 8 is loosely mounted on the axle 1 between the hubs of the gears 5 and 6, and carries a series of radial arms 9, whereby said hub is connected with the rim 10 of the gear, on which the sprocket or gear teeth 11 are formed. The rim 10 lies outside of the peripheries of the transmission gears 5 and 6, the inner faces of which are formed with beveled teeth of the ordinary type. The outer ends of the arms 9 are properly shaped to provide spindles 12 on which are revolubly mounted beveled pinions 13 meshing with the said teeth of the transmission gears, whereby a differential drive action is secured, as will be readily understood.

As shown, the hollow shaft or sleeve 4 is continuous or of a one-piece construction between the adjacent end of the shaft 1 and the gear 5, and to the outer end of said shaft 4 the hub 3ª of the wheel 3 is fixed in any preferred manner. The hub 3ª extends at its outer end beyond the outer end of the shaft 4 and is formed with an inturned annular shoulder 14 and annular guard cup 15. The shoulder 14 bears against the outer end of the axle or shaft 1, which latter terminates in a reduced stem 16 extending through the opening formed by said shoulder into the guard cup 15 and carrying a washer 17. This washer is held in engagement with the outer surface of the shoulder 14 by a nut 18 inclosed within the cup and engaging the outer end of the stem 16, which is threaded for its reception. The shoulder 14 thus prevents inward longitudinal movement of the shaft 4, thus positively spacing the gears 5 and 6 relative to each other and avoiding liability of objectionable pressure on the drive gear 7, while the form and arrangement of the flange 14, cup 15, stem 16, washer 17 and nut 18 insures the exclusion to a large degree of dust and dirt between the axle and hollow shaft as well as preventing outward endwise movement of the latter.

In operation, it will be understood that normally the axle, hollow shaft or sleeve and the traction wheels will be locked together by the differential gearing, but that in rounding curves in either direction or turning the vehicle the gearing will operate to permit one wheel to travel faster than the other in the usual way.

The construction described provides a compact form of gearing which, it is apparent, overcomes the disadvantages of those constructions wherein a divided axle shaft is employed.

Having thus described the invention, what I claim is:—

In a differential drive gearing for vehicles, the combination of a one-piece axle-shaft having at one end a reduced stem threaded at the outer end thereof, a traction wheel fixed to the opposite end of the axle, a transmission gear fixed to the axle between the center and first-named end thereof, a hollow shaft or sleeve journaled on the axle between said transmission gear and the said end of the axle provided with the stem, a traction wheel having a hub fixed to the outer end of the sleeve and formed at its outer end with a guard cup and an inturned annular shoulder at the juncture of said cup with the body of the hub, said shoulder being arranged to bear against the outer end of the axle and cover the joint between the same and the sleeve, and said stem extending through the opening formed by the shoulder into the cup, a washer upon the stem bearing against the outer surface of the shoulder, and a nut engaging the threaded outer end of the stem and bearing against said washer.

In testimony whereof I affix my signature in presence of two witnesses.

NEWTON M. ANDERSON.

Witnesses:
    FRED N. FLETCHER,
    ADDIE FIELDS.